United States Patent [19]
Perlick

[11] 3,717,229
[45] Feb. 20, 1973

[54] FLUID CLUTCH WITH ONE WAY TORQUE LIMITING ENGAGER

[75] Inventor: Mark A. Perlick, Brighton, Mich.

[73] Assignee: General Motors Corporation, Detroit, Mich.

[22] Filed: Aug. 16, 1971

[21] Appl. No.: 171,940

[52] U.S. Cl. ............... 192/85 AA, 192/45, 192/54, 74/730

[51] Int. Cl. .............................................. F16d 25/063

[58] Field of Search........192/85 A, 85 AA, 41 R, 45, 192/54, 83

[56] References Cited

UNITED STATES PATENTS

| 2,245,988 | 6/1941 | Lambert | 192/54 X |
| 2,587,823 | 3/1952 | De Pew | 192/85 AA X |
| 2,799,375 | 7/1957 | Forster | 192/54 X |
| 2,876,881 | 3/1959 | Parrett | 192/85 AA |
| 3,255,854 | 6/1966 | Schroter et al. | 192/54 |

Primary Examiner—Benjamin W. Wyche
Attorney—W. E. Finken et al.

[57] ABSTRACT

A power transmission capable of providing a plurality of forward speeds and including a torque converter, multi-speed planetary gearing and input clutches between the converter and gearing. The input clutches each include a mechanical energizing mechanism having a ball and ramp spring for mechanically energizing the clutch when the output shaft is being driven by the vehicle wheels. The energizing mechanism also limits the torque capacity of the clutch.

8 Claims, 5 Drawing Figures

PATENTED FEB 20 1973 3,717,229
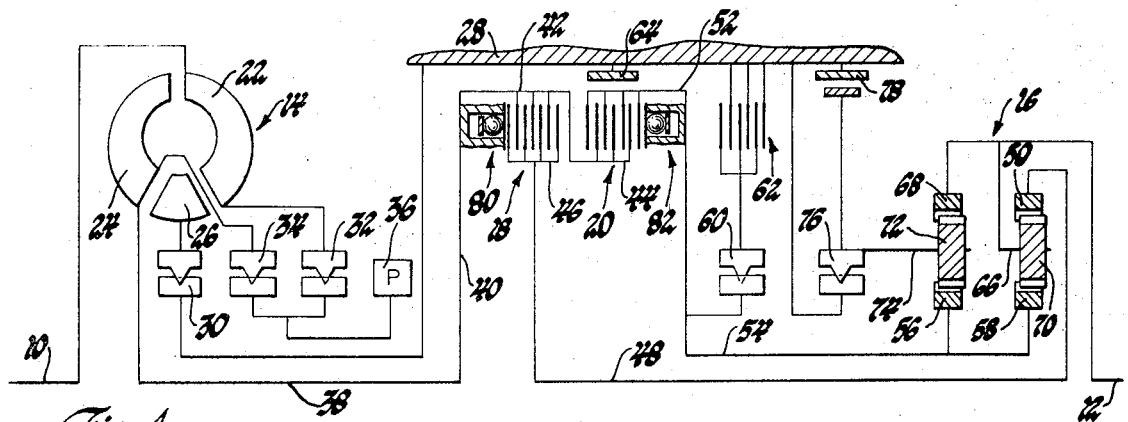
Fig. 1
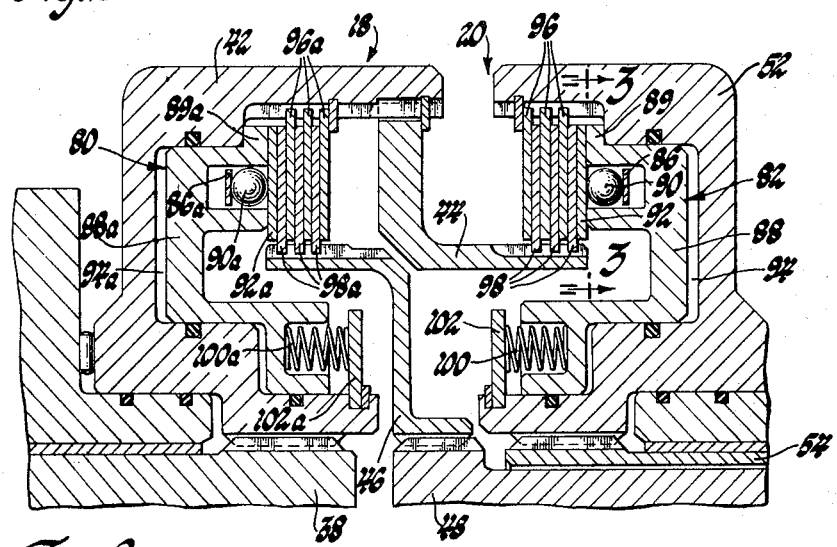
Fig. 2
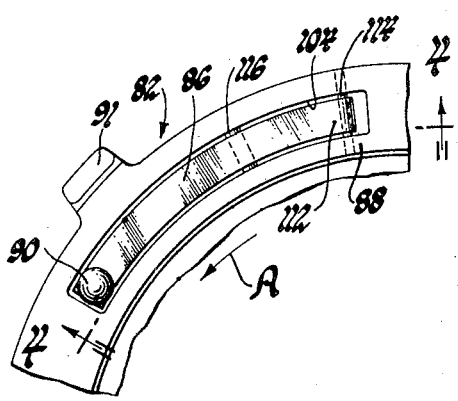
Fig. 3
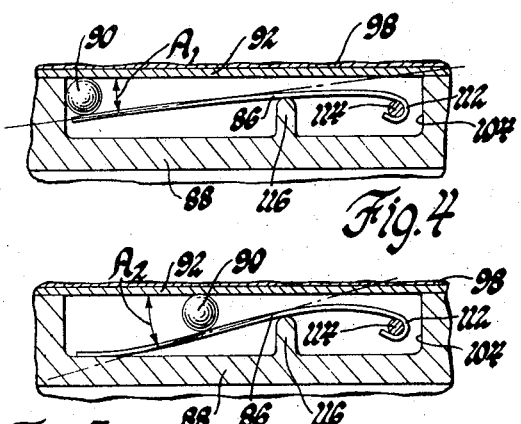
Fig. 4
Fig. 5
INVENTOR.
Mark A. Perlick
BY
Donald F. Scherer
ATTORNEY

FLUID CLUTCH WITH ONE WAY TORQUE LIMITING ENGAGER

This invention relates to power transmissions and more particularly to power transmissions having self-energizing clutches for back-up drive to the converter.

The invention described herein is useful in a transmission wherein it is desirable to maintain fluid pressure to operate the various fluid operated friction devices and to provide a drive from the output shaft to the input shaft when the vehicle is coasting with no engine power or when the vehicle is being pushed. Prior art transmissions have used either a positive displacement pump driven by the transmission output shaft to provide these functions or one-way drive devices connected directly between the output shaft and the input shaft to provide these functions. The addition of a positive displacement fluid pump connected to the output shaft increases the overall cost of the transmission and quite often the overall package size. The use of one-way drive devices between the output shaft and the input shaft of the transmission is not always possible or feasible depending upon gearing arrangement which is used in the transmission. This arrangement also results in increased cost of the transmission.

The present invention provides a back-up drive from the output shaft to the input shaft through the use of mechanical engagement of the input clutches. When the output shaft attempts to over-drive the input shaft, if the input clutches are not fluid operated at that time, the mechanical devices will cause the clutches to be engaged and thereby provide a drive from the output shaft to the turbine of the converter. The turbine is connected through a one-way drive to the positive displacement pump which supplies fluid for the torque converter and the transmission control. Thus, on coast with the engine not operating, the positive displacement pump is driven to supply fluid to the torque converter and the transmission control to engage the various friction devices in the transmission and to provide fluid for the torque converter. A torque converter when it is filled with fluid will provide a drive to the engine. Also, the positive displacement pump may be used to supply other operating apparatus such as power steering, brakes and load levelers, etc., which apparatus it is desirable to have operate when the vehicle is coasting without engine power.

The mechanical engagement device in the preferred embodiments includes a cantilever type spring disposed in the piston of the input clutches and a steel ball disposed between the spring and one of the disc members of the input clutch. The spring is formed so that it provides an angular ramp relative to the friction disc so that whenever the friction disc or piston is driven by the output shaft at a speed greater than the clutches being driven by the input shaft, the ball will roll up the ramp to apply an engagement force to the friction disc thereby applying the clutch. The spring will deflect away from the clutch plate as the ball is driven up the ramp so as to vary the angle the ramp makes with the clutch disc which will limit the apply force on the clutch disc. Also, a stop member is provided in one embodiment to limit the travel of the ball up the ramp and the apply force is limited by the spring deflection. When the piston is fluid operated during normal operation of the clutch the spring permits the ball to be deflected as the clutch piston moves toward the friction disc so that excessive loads are not placed on the friction disc by the ball.

It is therefore an object of this invention to provide in an improved transmission a mechanical energizing mechanism on the input clutch to provide a back-up drive from the output shaft to the input shaft.

It is another object of this invention to provide in an improved transmission a mechanical energizing mechanism including a ramp spring and ball which provide a limited apply force for the input clutch during a back-up drive condition.

These and other objects and advantages of the present invention will be more apparent from the following description and drawings in which:

FIG. 1 is a schematic representation of the transmission;

FIG. 2 is a cross-sectional elevational view of the input clutches of the transmission shown schematically in FIG. 1;

FIG. 3 is an end view of the ball and ramp taken along line 3—3 of FIG. 2;

FIG. 4 is a sectional view of the ball and ramp taken along line 4—4 of FIG. 3; and FIG. 5 is a view similar to FIG. 4 showing the ball in a different position.

Referring to the drawings wherein like characters designate like or corresponding parts throughout the several views there is shown in FIG. 1 a power transmission including input shaft 10, an output shaft 12, a torque converter 14, a planetary gearing arrangement 16 and a pair of input clutches 18 and 20. the torque converter 14 includes an impeller 22 driven by the input shaft 10, a turbine 24 and a stator 26 which is connected to the transmission case 28 through a one-way device 30. The pump 22 and turbine 24 are connected by one-way drive devices 32 and 34 respectively to a conventional positive displacement pump 36 which supplies fluid pressure in a conventional manner to operate the clutches and brakes of the transmission. A more detailed description of the torque converter 14, and the one-way drives 32 and 34 can be found in U.S. Ser. No. 122,041, now U.S. Pat. No. 3,665,707 filed in the name of E. A. Koivunen and assigned to the assignee of this application.

The turbine 24 drives an input shaft 38 which is connected through a hub 40 to drive an outer hub 42 and an inner hub 44 of the input clutches 18 and 20, respectively. An inner hub 46 of clutch 18 is connected by a shaft 48 to a ring gear 50 of the planetary gearing arrangement 16. An outer hub 52 of the input clutch 20 is connected via shaft 54 to b pair of sun gears 56 and 58 of the planetary gear set 16. The hub 52 and shaft 54 are also connected via a one-way brake 60 to a selectively operable friction brake 62 which is operatively connected with the transmission housing 28. The hub 52 may also be selectively held stationary by a band type brake 64 which is operatively connected with the transmission housing 28. The output shaft 12 is drivingly connected to a carrier 66 and a ring gear 68 which are members of the planetary gearing 16. The planet carrier 66 rotatably supports a plurality of planet pinions 70 which mesh with the sun gear 58 of the ring gear 50. The sun gear 56 is operatively connected with the ring gear 68 through a plurality of planetary pinions 72 which mesh therewith and are rotatably mounted on a planet carrier 74 which is operatively connected through a one-way device 76 with the transmission housing 28 and through a selectively operable band brake 78 with the transmission housing 28. The gearing arrangement shown herein is described in detail in the patent issued to Winchell et al. U.S. Pat. No. 3,321,056 and reference may be had thereto to determine the detailed operation of the transmission. It is sufficient here to note that the transmission will provide three forward speeds and a reverse speed by selective operation of the various clutches and brakes. A suitable control for the operation of the clutch and brakes is also found in Winchell et al.

The transmission as described in Winchell et al. will not provide a back-up drive from the output shaft 12 to the torque converter 14 if the positive displacement pump 36 is not driven by the input. The transmission shown in FIG. 1 differs from Winchell in that mechanical engaging or energizing mechanisms 80 and 82 disposed in input clutches 18 and 20, respectively, will initiate a clutch engagement to permit a back-up drive between the output shaft 12 and the torque converter 14 when the positive displacement pump 36 is not being driven.

The engaging mechanisms 80 and 82 are similar in construction and are shown in more detail in FIGS. 2 through 5. The engaging mechanism 82 is disposed in the input clutch 20 and includes a leaf spring 86 disposed in a clutch piston 88 which is slidably mounted in the hub 52 and a ball 90 disposed adjacent the leaf spring 86. The clutch piston 88 is drivingly connected to the hub 52 by a plurality of tangs 91, spaced about the periphery thereof, engaging slots, not shown, in the hub 52. The piston 88 has a shoulder 89 which abuts a shoulder on the hub 52 when the piston is not hydraulically energized, thus providing a reaction point for the engaging mechanism 80. The ball 90 abuts a free floating plate or disc 92 which normally rotates with the piston 88. When the clutch 20 is not engaged, relative rotation occurs between friction discs 96 drivingly connected to the hub 52 and friction discs 98 drivingly connected to the hub 44. Slippage also occurs between disc 92 and friction disc 98 adjacent thereto. In normal operation, the clutch 20 is engaged by fluid pressure admitted to a chamber 94 formed between the housing 52 and the piston 88. When the fluid chamber 94 is pressurized the piston 88 urges the disc 92 toward friction disc 98 to cause a friction engagement between disc 92 and friction disc 98 and also between the disc 96 and the discs 98 thus providing a drive connection between shaft 38 and the shaft 54. When the chamber 94 is not pressurized a plurality of coil springs 100 compressed between a piston 88 and a washer 102 secured in the hub 52 urges the piston away from the friction disc to disengage the clutch 18. In the disengaged position the ball 90 still contacts the spring 86 and the disc 92.

The clutch 18 and the mechanical energizing mechanism 80 are similar in design and structure to the clutch 20 and the energizing mechanism 82 so that the corresponding parts have been given the same numerical designation with an *a* suffix. As seen in FIG. 3 the spring 86 is arcuate in shape and is disposed in a spring pocket 104 in the clutch piston 88. The spring 86 is arranged so that three springs may be placed in three separate spring pockets around the piston 88. The spring 86 has one end 112 fixed to the clutch piston 88 by a pin 114. The spring 86 then extends over a fulcrum 116 formed in the clutch piston 88. The spring 86 is disposed at an angle $A_1$ relative to the drive 92 and has a light preload force which maintains the ball 90 in contact with the disc 92 so that a light drag pressure is applied between the disc 92 and the disc 98. However, when the hub 52 and piston 88 are driven by the output shaft 12 through the gearing 16 and shaft 54, such as when the vehicle is coasting with the engine stalled or when the vehicle is being pushed, the piston 88 will be rotated in the direction of arrow A shown in FIG. 4 relative to the disc 92 to cause the ball 90 to roll up the ramp formed by the spring 86. As the ball 90 moves up the ramp spring 86, the ramp force will cause the disc 92 to move away from piston 88 thereby causing the friction discs 96 and 98 to be engaged with increasing force and also causing the spring 86 to deflect thereby forming a larger angle $A_2$ with the disc 92. When the spring 86 has deflected sufficiently to form an angle whose tangent is equal to the coefficient of friction of the discs 96 and 98, further deflection will not occur and the torque of the clutch will be limited at this value. If the torque requirement is low, the angle of the spring will be less than $A_2$. The movement of the ball 90 along the spring ramp will cease when the torque capacity of the clutch is equal to the torque requirement. Thus, the clutch is automatically controlled and its capacity is limited by the maximum spring ramp angle $A_2$.

If the clutch 20 is hydraulically engaged, when the ball 90 is in the position shown in FIG. 5, the spring 86 will deflect further to permit the plate 92 to abut the piston 88. This deflection is within the operative spectrum of the springs. This may occur for example if the vehicle is coasting with the engine off and the transmission control conditioned for a forward or reverse drive when either or both clutches are mechanically engaged. The pump 36 will supply fluid to engage the various friction devices of the transmission and other accessory units to which it is connected, such as power steering and power brakes. The clutches will also be engaged if the vehicle coasts in neutral with the engine off. However, under this condition the clutches will not be hydraulically engaged by the pump 36. The pump 36 will continue to supply accessory units as discussed above.

The mechanical engaging mechanism 80 is similar to the mechanism 82. Its operation is the same with the exception that in the clutch 18 the disc 98a is driven by the output shaft when the vehicle is in a back-up drive condition so that the friction disc 98a driven by the hub 46 initiates movement of the ball 90a to energize the clutch 18 while in clutch 20 movement of the piston 88 relative to the disc 92 initiates movement of the ball 90 to energize the clutch.

Obviously, many modifications and variations of the present invention are possible in light of the above teachings. It is, therefore, to be understood that within the scope of the appended claims the invention may be practiced otherwise than as specifically described.

What is claimed is:

1. A power transmission comprising in combination, input means; output means; fluid operated clutch means for transmitting power from said input means to said output means when said clutch is fluid operated and including an input member, an output member, piston means operatively connected with one of said members, pressure plate means operatively connected with said other member; spring means disposed in said piston means at an angle relative to said pressure plate, and ball means disposed between said spring means and said pressure plate to impose a force from said spring member on said pressure plate; said output member at times being driven by said output means to cause relative rotation between said piston means and said pressure plate means and said ball means being moved along said spring means to deflect said spring means to impose an increasing force on said pressure plate from said spring member to engage said clutch means mechanically to permit a drive force to be transmitted from said output means to said input means.

2. A power transmission comprising in combination, input means; output means; fluid operated clutch means for transmitting power from said input means to said output means when said clutch is fluid operated and including an input member, an output member, piston means operatively connected with one of said members, pressure plate means operatively connected with said other member; spring means disposed in said piston means at an angle relative to said pressure plate, and ball means disposed between said spring means and said pressure plate to impose a force from said spring member on said pressure plate; said output member at times being driven by said output means to cause relative rotation between said piston means and said pressure plate means and said ball means being moved along said spring means to deflect said spring means to impose an increasing force on said pressure plate from said spring member to engage said clutch means mechanically to permit a drive force to be transmitted from said output means to said input means and said angle of said spring increasing relative to said pressure plate as said force increases.

3. A transmission comprising in combination, input means; output means; selectively operable fluid operated clutch means for operatively connecting said input and output means including an input member operatively connected with said input means, an output member operatively connected with said output means, a piston drivingly connected with one of said members, and disc means drivingly connected with the other of said members; and mechanical engaging means including spring means connected to said piston and disposed at an angle relative to said disc means, and ball means disposed between said spring means and said disc means, said ball means being operable to move along said spring means to impose a force on said disc means when said output member is rotated faster than said input member to mechanically engage said clutch and said angle of said spring varied by said ball means and said disc means when said clutch is mechanically engaged and said angle limiting the mechanical engaging force of said mechanical engaging means.

4. A power transmission comprising in combination, input means; output means; fluid operated clutch means for transmitting power between said input means to said output means when said clutch is fluid operated and including an input member normally driven in a forward direction by said input means, an output member, piston means operatively connected with said output member, pressure plate means operatively connected with said input member; spring means disposed in said piston means at an angle relative to said pressure plate with the trailing edge of said spring being closer to said pressure plate in the forward direction, and ball means disposed between said spring means and said pressure plate to impose a force from said spring member on said pressure plate; said output member at times being driven in the forward direction by said output means to cause relative rotation between said piston means and said pressure plate means and said ball means being moved along said spring means by the relative rotation to deflect said spring means to impose an increasing force on said pressure plate from said spring member to engage said clutch means mechanically to permit a drive force to be transmitted from said output means to said input means and said angle of said spring increasing relative to said pressure plate as said force increases.

5. A power transmission comprising in combination, input means; output means; fluid operated clutch means for transmitting power between said input means to said output means when said clutch is fluid operated and including an input member normally driven in a forward direction by said input means, an output member, piston means operatively connected with said input member, pressure plate means operatively connected with said output member; spring means disposed in said piston means at an angle relative to said pressure plate with the leading edge of said spring being closer to said pressure plate in the forward direction, and ball means disposed between said spring means and said pressure plate to impose a force from said spring member on said pressure plate; said output member at times being driven in the forward direction by said output means to cause relative rotation between said piston means and said pressure plate means and said ball means being moved along said spring means by the relative rotation to deflect said spring means to impose an increasing force on said pressure plate from said spring member to engage said clutch means mechanically to permit a drive force to be transmitted from said output means to said input means and said angle of said spring increasing relative to said pressure plate as said force increases.

6. A power transmission comprising in combination, input means; output means; fluid operated drive means for establishing a drive between said input means and said output means when said drive means is fluid operated and including a first member and a second member mounted for relative rotation, friction plate means operatively connected between said members including pressure plate means having a free end face portion and operatively connected to one member and backing plate means operatively connected to a member, fluid motor means including piston means operatively connected with the other of said members having a face portion engaging said face portion of said pressure plate means during engaging movement for applying a force to said pressure plate means for engaging said friction plate means for establishing said drive and reaction means to limit disengaging movement of said piston, one way engaging means including spring means annularly disposed on one face portion at an angle relative to said face portions and having a more resilient portion spaced a greater distance from the other face portion and the resilience decreasing to a less resilient portion spaced closer to said other face portion, and roller means disposed between and engaging said spring means and said other face portion to impose a force between said spring member and said pressure plate means and means to limit movement of said roller beyond said more resilient portion of said spring, beyond said less resilient portion of said spring and permit movement therebetween and operative when relative rotation of said piston means and pressure plate means moves said roller means to said more resilient portion of said spring to cause said spring to hold said roller in light contact with said pressure plate means insufficient to cause engagement of said friction plate means for establishment of said drive means but permitting said engagement of said friction plate means by said piston and when relative rotation of said piston means and pressure plate means is in the opposite direction to move said roller means toward said less resilient portion of said spring means to cause said spring means and roller to apply an increasingly high apply force between said pressure plate means and piston means and with the piston means against said reaction means apply said pressure plate to engage said friction plate means to establish said drive means.

7. The invention defined in claim 6 and annular recess means in said one face portion providing a guide for said roller means and an abutment for said spring means just beyond said less resilient portion, said spring means being annular leaf spring means positioned in said recess means and secured to said one face portion further beyond said less resilient portion and engaging said abutment for providing said less resilient portion and having a free end providing said more resilient portion.

8. The invention defined in claim 6 and annular recess means in said one face portion providing a guide for said roller means and an abutment for said spring means just beyond said less resilient portion, said spring means being an annular leaf spring positioned in said recess means and having one end portion secured to said one face portion further beyond said less resilient portion and engaging on one side said roller means and on the other side engaging said abutment just beyond said less resilient portion and on the base of said recess at the other free end portion when said roller means is in said less resilient portion for providing said less resilient portion and having said other free end providing said more resilient portion when said roller means is in said more resilient portion.

* * * * *